Jan. 13, 1959

L. D. WILSON ET AL 2,868,340

RECORD FEEDING CONTROL MEANS

Filed June 13, 1955

2 Sheets-Sheet 1

INVENTORS
LOUIS D. WILSON
STANLEY M. OSTER
THOMAS ASH

BY [signature]

ATTORNEY

Jan. 13, 1959 L. D. WILSON ET AL 2,868,340

RECORD FEEDING CONTROL MEANS

Filed June 13, 1955

2 Sheets-Sheet 2

INVENTORS
LOUIS D. WILSON
STANLEY M. OSTER
THOMAS ASH
BY
ATTORNEY 2,868,340

RECORD FEEDING CONTROL MEANS

Louis D. Wilson and Stanley M. Oster, Philadelphia, Pa., and Thomas Ash, Mount Holly, N. J., assignors to Remington Rand Inc., Norwalk, Conn., a corporation of Delaware Application June 13, 1955, Serial No. 515,064

12 Claims. (Cl. 192—4)

This invention relates to a record feeding control mechanism and in particular to one of the magnetic clutch type, particularly adapted for use in controlling the feed of a magnetic record employed in a high speed electronic computer.

In computers of a type referred to, by way of example, the data to be processed is sensed from two hundred and forty or more punched data cards per minute and, through a suitable converter, is encoded for entry on a magnetic tape by a recording head at a pulse density of one hundred and twenty items per inch. The items are grouped in spaced blockettes of one hundred and twenty items apiece and six blockettes make up a seven hundred and twenty block of items which is the minimum information or data unit accepted by the computer. The data recorded on the tape is subjected to a number of checking and comparing tests which necessitates forward and reverse movements of the tape for the purpose of reading the data from each blockette a number of times. The tape, in the various checking operations, must be started, stopped and reversed in its travel and after checking returned to the point at which the next blockette of data is to be recorded as disclosed in an application of common assignee S. N. 515,102, filed June 13, 1955.

It is therefore an object of the invention to provide a tape operating clutch means for a record feeding mechanism that can be magnetically conditioned for the purpose of closely controlling the movement of a driving member in forward and reverse directions.

A further object of the invention is to provide a compact structure with a minimum number of parts and a minimum amount of movement between the parts in change of direction operation so that the driven member will be positively driven with the least lost motion possible.

A still further object of the invention is to arrange the magnetic conditioning means with respect to each other so that, in braking and reverse drive operations, the inertia of the number of parts to be overcome is held to a minimum whereby the driven member can be quickly and accurately started, stopped and reversed to space the data on a tape driven thereby.

Figure 1:
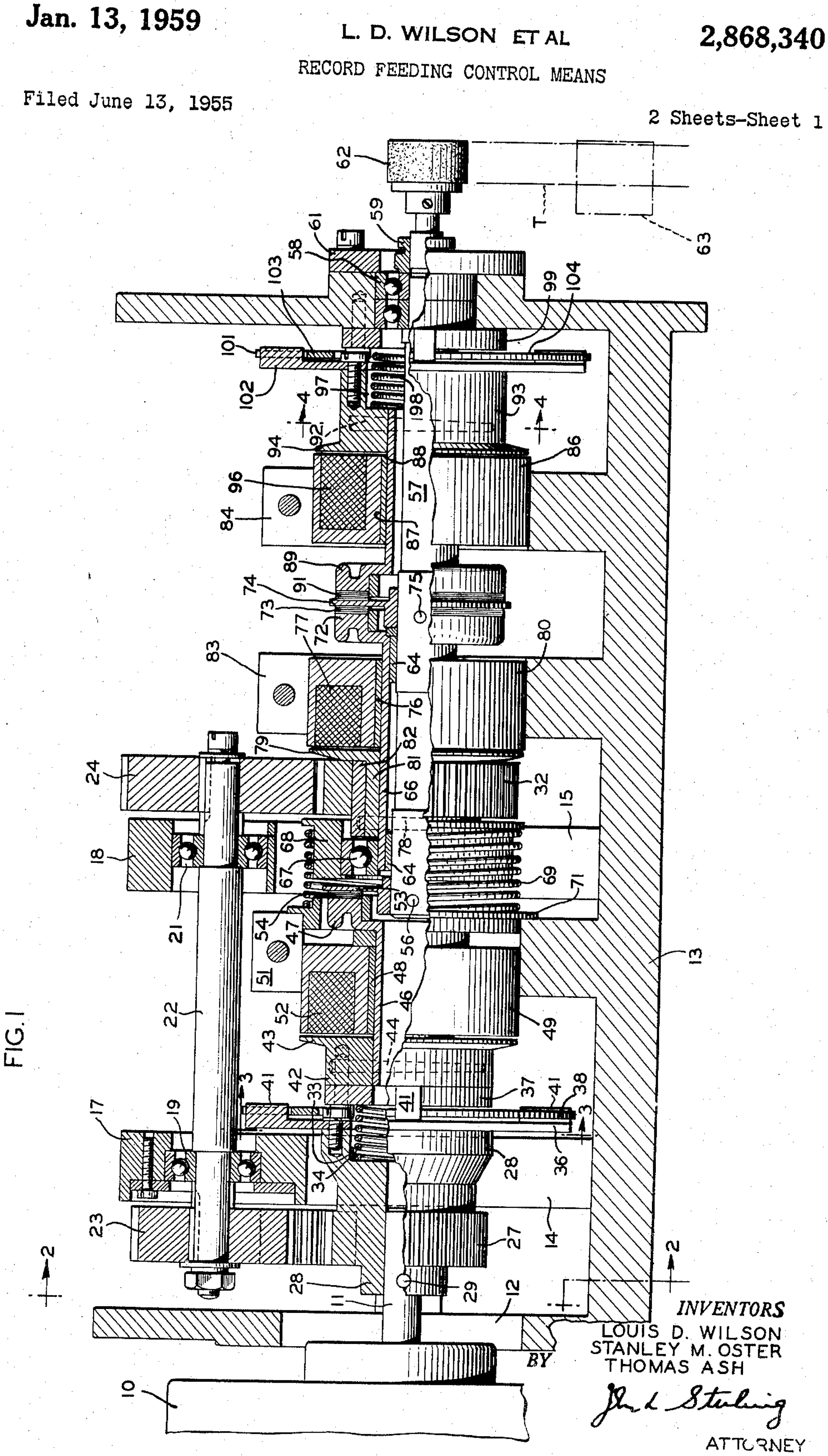
Figure 2:
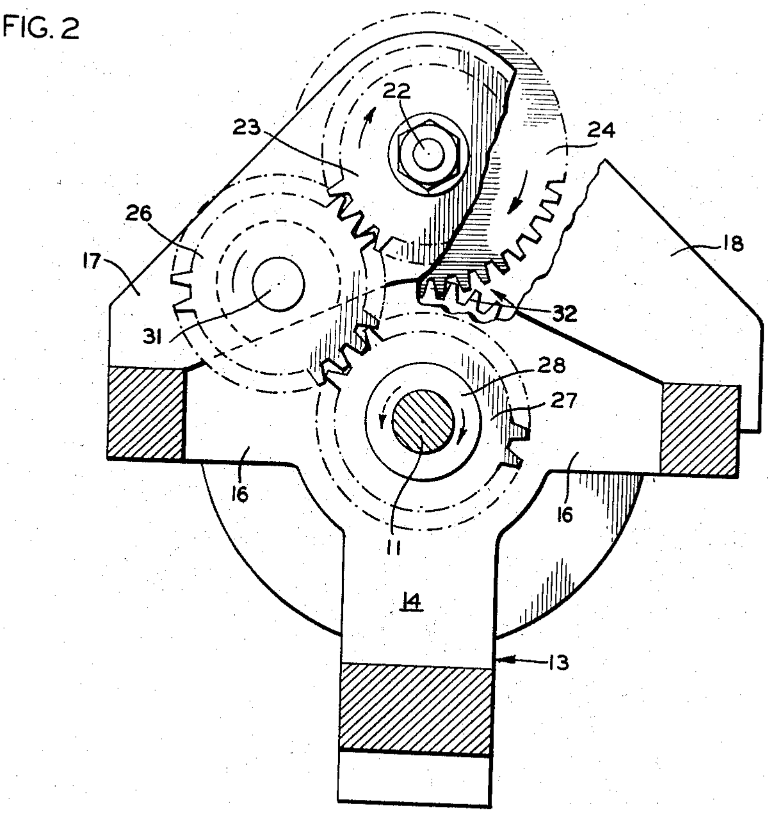
Figure 3:
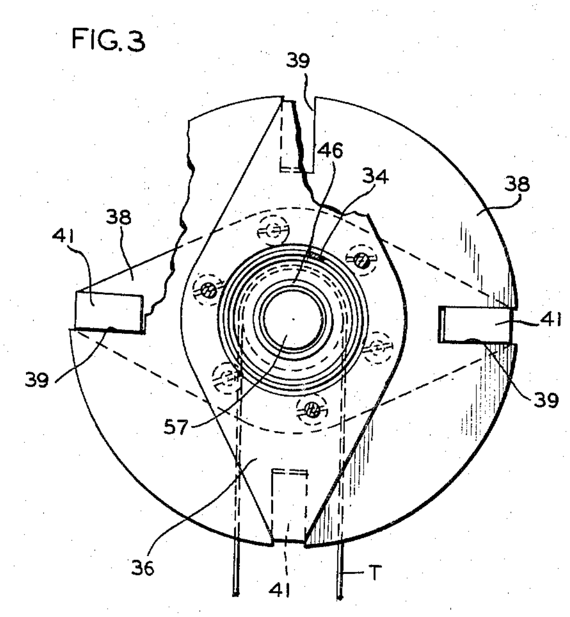
Figure 4:
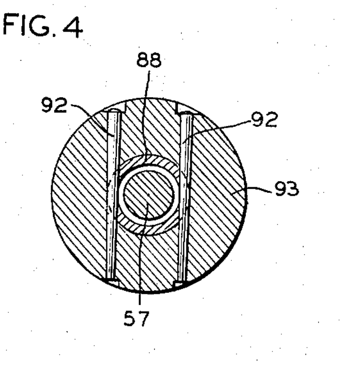

Other objects and structural details of the invention will be apparent from the following description when read in connection with the accompanying drawings, in which:

Fig. 1 is a side view of the tape operating clutch structure broken away to show in section the relation of the various parts thereof, Fig. 2 is a vertical section taken on the line 2—2 of Fig. 1 showing the relative location of the reverse gearing of the clutch, Fig. 3 is a vertical section taken on the line 3—3 of Fig. 1 showing the structure of one of the adjustable movement transfer means employed between different sections of the clutch, and Fig. 4 is a vertical section taken on the line 4—4 of Fig. 1 showing means for providing a drive connection between the parts.

Referring to the drawings in detail, 10 indicates a suitably mounted electric motor providing continuous drive for a motor shaft 11, of stud form, extending through an opening 12 in one end of a clutch frame 13. The latter is shaped to provide spaced T members 14 and 15 upon whose arms 16 are mounted, in spanning relation, the support 17 and 18 for bearings 19 and 21, respectively, for support of a counter shaft 22 to the opposite ends of which are keyed the counter shaft pinion 23 and the counter shaft gear 24. The pinion 23 is driven through an idler gear 26 from a drive gear 27, the teeth of the latter of which are milled at one end of a gear sleeve 28 fastened by a pin 29 to the stud shaft 11. The idler is mounted for free rotation on a stud shaft 31 extending from the support 17 and the drive through the counter shaft 22 and gear 24 is to reverse gear 32, which will be referred to hereinafter. The sleeve 28 at the end opposite the gear 27 is recessed as at 33 to hold a compression spring 34 which bears against one of a pair of spanner plates 36 and 37 (Fig. 1) disposed at opposite sides of a floating drive transfer disk 38 notched at spaced points on its periphery as at 39 to receive the laterally projecting tongues 41 of said plates which are disposed at right angles to each other. The plates and disk each have a concentric opening in axial alignment with the motor shaft 11.

The plate 36 is secure to the recessed end of the sleeve 28 while plate 37 is fixed to the hub of an armature 42 flanged to provide a face portion 43. The hub is secured by chordally arranged pins 44 to the tubular portion 46 of a forward drive clutch member 47 slidably mounted in a liner 48 in the bore of an annular housing 49 secured in a clamp 51 formed in the frame 13. The housing contains a coil 52 arranged to be energized to provide electromagnetic means hereafter referred to as a forward drive magnet for attracting the armature 42 to force the clutch or pressure member 47 into driving relation with a disk 53 through the medium of the friction ring lamina 54, of which there are two sets and which are used as facings for the clutch 47 and the disk 53. The spring 34 maintains a slight pressure on the clutch but not sufficient to cause the armature to engage the magnet or to transmit the driving effort of the member 47 to disk 53. The spring takes up any lost motion in the parts so that energization of the magnet will cause immediate operation of the clutch. The armature, which revolves with the sleeve 46 does not come into contact with the forward drive magnet 52 at any time.

The forward drive disk 53 is pinned as at 56 to the drive shaft 57 which is mounted for rotation in bearings 58 in an end wall of the frame; the shaft being secured by a limit nut 59 and passing through a bearing lock plate 61 to carry at its outer terminal a capstan 62 having a cork or like surface for feeding a tape T. The latter is shown in outline in relation to a data recording and reading head 63 of the type shown in the application above referred to. The shaft 57 is supported in spaced bushings 64 providing bearings for the sleeve 66 which at one end is journalled in the bearing 67 of a cup 68 externally flanged to hold one end of a compression spring 69 whose opposite end abuts an annulus 71 secured in the clamp 51. This spring will exert slight pressure endwise on the sleeve 66 to maintain the reverse clutch or pressure plate 72 in non-driving engagement with clutch ring lamina 73 disposed on the reverse drive face of clutch plate 74, fixed by pin 75 to drive shaft 57. The sleeve 66 is slidably supported in the liner 76 in the bore of a reverse drive magnet 77 in a housing 80 similar in structure to the forward drive magnet 52 above described. The sleeve 66 has secured thereto, as by chordal pins 78 an armature 79 on whose hub 81 is fixed the reverse gear 32 through a suitable key or mounting bushing 82.

The reverse drive magnet 77 is secured in a clamp 83 adjacent a similar clamp 84 in which a brake magnet housing 86 is held. The latter is provided with a liner 87 in its bore, in which is revolvably mounted a sleeve portion 88 shaped to provide at one end a braking plate 89 abutting ring lamina 91 on the opposite face of the clutch disk 74. The opposite end of the sleeve has secured thereto by chordal pins 92 (Fig. 4) the hub 93 of an armature 94 facing the brake magnet coil 96 in the housing 86, the hub being recessed as at 97 to seat a compression spring 98 which bears against a spanner coupling plate 99, which is secured to the frame. The spring takes up any lost motion between the clutch plate 89 and lamina 91 but does not make a driving connection between the latter as this is accomplished when the brake magnet 96 is energized to draw the armature 94 toward it, the latter being at all times spaced from the magnet and being free to revolve. The plates 99 and 102 form a coupling similar to that at Fig. 3 and are provided with tongues 101 for engagement with the notches 103 of a central floating transfer disk 104, the structure and purpose being substantially the same as for the members 36, 37 and 38 above referred to.

In the operation of the clutch, as a whole, when the tape T is to be driven in forward direction, the forward drive magnet 52 is energized and attracts the armature 42 to transfer the drive from sleeve 28 through the transfer disk 38 and sleeve 46 to the forward drive clutch 53 and thence through shaft 57 to the capstan. The drive from gear 27 through idler 26, pinion 23, counter shaft 22, gear 24 and reverse gear 32 is constant but ineffective unless the reverse magnet is energized. Between the forward and reverse drive operations or for any stoppage of the tape, energization of the brake magnet 96 will attract its armature 94 and through the sleeve 88 and clutch 89, prevent rotation of the clutch disk 74 and the shaft 57 to which it is fastened by pin 75. For reversing the direction of travel of the tape, the reverse drive magnet 77 is energized to attract its armature 79 and move the sleeve 66 endwise to cause the reverse clutch plate 72 to drive the clutch plate 74. The reversing gears now turn the shaft 57 in the opposite direction from the rotation of shaft 11 so that the tape is moved backward. Stoppage of the tape in its reverse travel is through energization of the brake magnet 96 as above described. As any magnet is energized, the others are deenergized. The floating disk transfer plate combinations function as adjustable driving connectors and the various springs maintain the non-driving connections between the driving clutch members except when they function under control of the various armatures in selectively driving the tape in forward and reverse motion and for stopping feed thereof in either direction.

It is evident that the construction of the clutch particularly adapts it for very close control of the movement of a tape in either direction and the stopping of it in order to provide for the proper recording and spacing operations. This is accomplished by providing for a minimum of movement between the parts actuated by the various magnets for controlling clutching operations and a minimum number of parts for carrying out the work.

While there has been shown and described the fundamental novel features of the invention as applied to a specific type of clutch, it will be understood that various omissions, substitutions and changes in the form and details of the device illustrated and in its operations may be made by those skilled in the art without departing from the purposes of the invention. It is therefore fitting that the appended claims be given broad interpretation, consistent with the spirit and scope of the invention.

What is claimed is:

1. In a record operating control mechanism; gear means for driving a shaft; magnet coil means including a coil and a coil housing having a central bore; a clutch disk fixed on the shaft at one side of said housing armature means including an armature disk at the opposite side of said housing and movable by said coil means when the latter is energized, clutch sleeve means fixed to said armature means and journaled in said bore for longitudinal movement when the armature disk is moved, said clutch means being shaped to provide a pressure end for driving contact with said clutch disk; and means slidably connecting said armature means with the gear means for transferring the drive to said shaft through said armature means, the sleeve means and the clutch disk when said coil is energized.

2. Apparatus of the character set forth in claim 1 including braking means associated with said shaft and magnetic means for controlling the operation of said braking means to stop said shaft.

3. A record operating control mechanism comprising continuously driven gear means; a record drive shaft; a clutch member secured to said shaft; magnetic means including a housing having a bore in axial alignment with said shaft and a magnetic coil in said housing; means for transmitting drive movement from said gear means to said clutch member including a rotary, sleeved, pressure element journaled in said bore and movable endwise for engaging said clutch member; an armature secured to said pressure member for moving the latter endwise when the coil is energized; and disk means between the armature and said driven gear means including plates, carried by said armature and gear means in interlocking adjustable flanking relation to said disk means for transferring the motion of the driven gear to said armature.

4. A record feed control mechanism comprising continuously driven gear means; a record drive shaft; magnetic means including a housing having a bore and a magnetic coil in said housing; a clutch plate member secured to said shaft at one side of said housing; means for transmitting drive movement from said gear means to said clutch plate member including a rotary sleeved pressure element journaled in said bore and movable longitudinally of said shaft for engaging said clutch plate member; armature means at the other side of said housing and secured to said pressure element for moving the latter longitudinally when the coil is energized and said armature means including a gear of said driven gear means.

5. A record feed control mechanism comprising a continuously driven gear train including a forward drive gear and a reverse gear; a shaft for moving a record in opposite directions; a forward-drive clutch member plate and a reverse drive clutch disk member secured to said shaft; magnetic means including spaced housings each having a coil therein and an axial bore; means for transmitting movement from each of said gears to each of said clutch plate and disk members including a sleeved armature element journaled in each bore and movable endwise for engaging its respective clutch member when the related coil is energized, and means for transferring movement of each of said gears to each of said transmitting means.

6. A record feed control mechanism comprising a continuously driven gear train including forward and reverse drive gears; a shaft for moving a record in opposite directions; a forward drive clutch plate member and a reverse drive clutch disk member secured to said shaft; magnetic means including spaced housings each having a magnetic coil therein and an axial bore; means for transmitting continuous driving movement from each of said gears to each of said clutch plate and disk members in opposite directions, including a sleeved armature clutch element journaled in each bore and movable endwise for engaging its respective shaft clutch member for driving operation when the related coil is energized, and means for holding each of said elements in non-driving contact with its respective shaft clutch member when the respective coil is deenergized.

7. A record feed control mechanism comprising a continuously driven gear train including forward and reverse drive gears; shaft means for moving a record in opposite directions including a forward drive clutch plate element and a reverse drive clutch disk element; magnetic coil means including spaced housings for the coils each having an axial bore; means for transmitting continuous driving movement from each of the gears to each of said clutch plate and disk elements including a sleeved armature clutch member journaled for rotation in each bore and movable endwise therein by said coil for engaging its respective clutch element for driving engagement when the related coil is energized; means for holding each of said elements in engagement with its respective clutch member in non-driving contact; means coacting with said holding means for providing adjustable driving connection between the parts, and one of said armature clutch members constituting a braking means.

8. The combination with a feed mechanism including a record moving shaft having a clutch disk thereon and an operating magnet associated therewith; of a clutch pressure sleeve member fitting about said shaft and passing through said magnet; a rotary armature secured to said sleeve member for moving the latter endwise, when the magnet is energized, to engage the clutch pressure member with said disk to drive the shaft; and means for yieldably holding said clutch pressure member in non-driving contact with said disk at all times.

9. A record operating control mechanism comprising a frame; a gear train for constant drive including forward and reverse drive gears; record drive shaft means including spaced clutch disks; magnetic means including spaced housings each having a bore; clamp means for mounting said housings in the frame with the bores of the housings in axial alignment; a magnetic coil in each housing; means for transmitting drive movement from said gear train to said clutch disks including rotary, endwise movable pressure elements sleeved to fit about said shaft and for journal support in said housings; an armature at one end of each element for magnetic attraction by an opposing coil; a clutch pressure plate at the other end of the element engaging an opposing clutch disk of the shaft with driving pressure when the coil is energized to attract said armature; means for yieldably holding said pressure plate in non-driving engagement with said clutch disk when the coil is deenergized; movement transfer means, connecting one of the gears of said train and one of the pressure elements, including a floating drive disk and drive plates flanking said drive plate for lateral adjustment relatively thereto; and one of the gears of said train being secured to one of said pressure elements.

10. Apparatus of the character set forth in claim 9 including a brake element, movable endwise to apply braking pressure to one side of one of the clutch disks of said shaft means, including an armature; magnetic coil means for attracting said armature to apply said braking pressure; means for connecting the brake element to said frame including a floating disk and spanner plates connected respectively to the frame and to the brake element in flanking relation to said floating disk, and interfitting tab and notch means in said floating disk and spanner plates for endwise movement of said brake element.

11. In a record operating control mechanism including a gear train; record drive shaft means; a plurality of clutch means for selectively transmitting motion from the gear train for operating the shaft in opposite directions; a reverse drive clutch disk on said shaft, one face of which is engaged by one of said clutch means; a brake element movable endwise to apply braking pressure to the opposite side of said disk, including an armature; magnetic coil means for attracting said armature to apply said braking pressure; means for connecting the brake element to said frame including a floating disk and spanner plates connected respectively to the frame and to said brake element in flanking relation to said floating disk; and interfitting tab and notch means in said floating disk and spanner plates for endwise movement of said brake element.

12. In a record operating control mechanism; constantly operating gear means for driving a shaft; magnetic coil means including a coil housing having a central bore; a clutch disk on the shaft; an armature means coacting with said coil means including a sleeve journalled in said bore for longitudinal movement and shaped to provide a pressure end for driving contact with said disk; means slidably connecting said armature means with the gear means for transferring the drive to said shaft through said armature means when said coil means is energized; braking means associated with said shaft and magnetic means for controlling the operation of said braking means to stop said shaft.

References Cited in the file of this patent

UNITED STATES PATENTS

| | | |
|---|---|---|
| 761,459 | Eastwood | May 31, 1904 |
| 2,687,789 | Nardone | Aug. 31, 1954 |
| 2,757,768 | Landerer | Aug. 7, 1956 |

Disclaimer 2,868,340.—*Louis D. Wilson*, and *Stanley M. Oster*, Philadelphia, Pa., and *Thomas Ash*, Mount Holly, N.J. RECORD FEEDING CONTROL MEANS. Patent dated Jan. 13, 1959. Disclaimer filed Jan. 3, 1966, by the assignee, *Sperry Rand Corporation*.

Hereby enters this disclaimer to the remaining term of said patent.

[*Official Gazette May 24, 1966.*]